(12) United States Patent
Sischka

(10) Patent No.: US 6,439,739 B1
(45) Date of Patent: Aug. 27, 2002

(54) INCANDESCENT LAMP

(75) Inventor: Ingolf Sischka, Aachen (DE)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/670,130

(22) Filed: Sep. 26, 2000

(30) Foreign Application Priority Data

Sep. 28, 1999 (DE) .......................... 199 46 297

(51) Int. Cl.$^7$ .............................. B60Q 1/04; F21V 7/00
(52) U.S. Cl. ...................... 362/211; 362/516; 362/544
(58) Field of Search .................. 362/211–215, 543, 362/544, 516

(56) References Cited

U.S. PATENT DOCUMENTS

| | | | | |
|---|---|---|---|---|
| 4,598,342 A | * | 7/1986 | English et al. | 362/213 |
| 5,081,565 A | * | 1/1992 | Nabha et al. | 362/465 |
| 5,089,942 A | * | 2/1992 | Sekiguchi | 362/214 |
| 5,111,368 A | * | 5/1992 | Suzuki et al. | 362/214 |
| 5,578,893 A | * | 11/1996 | Yamamoto | 313/112 |
| 5,614,788 A | | 3/1997 | Mullins et al. | 315/82 |
| 5,725,298 A | * | 3/1998 | Kalze et al. | 362/214 |
| 5,857,764 A | * | 1/1999 | Tabata et al. | 362/214 |

FOREIGN PATENT DOCUMENTS

DE 19510542 A1 11/1995

* cited by examiner

*Primary Examiner*—Alan Cariaso
(74) *Attorney, Agent, or Firm*—Frank Keegan

(57) ABSTRACT

The invention relates to an incandescent lamp with at least one incandescent coil which can be used for generating a high beam in a motor vehicle headlight, which lamp is additionally capable of performing the function of a daytime running light. The use of a dimmed high beam as an energy-saving daytime running light (DRL) has the disadvantage of a light distribution belonging to the high beam which is unsuitable for the function of a daytime running light. Furthermore, the high beam, if it is to fulfill the requirements as regards the maximum luminous intensity of the daytime running light, would have to be so strongly dimmed that the halogen cycle in the bulb of the incandescent lamp can no longer be maintained. This will lead to blackening at the bulb inside and a shorter lamp life. To create an incandescent lamp which renders possible an improved realization of a daytime running light function in a motor vehicle headlight, an incandescent lamp is presented with at least a first incandescent coil for generating a high beam in a motor vehicle headlight and at least a second incandescent coil for generating a daytime running beam in a motor vehicle headlight.

8 Claims, 1 Drawing Sheet

INCANDESCENT LAMP

BACKGROUND OF THE INVENTION

The invention relates to an incandescent lamp with at least one incandescent coil which can be used for generating a high beam in a motor vehicle headlight, by means of which lamp in addition the function of a daytime running light can be performed.

Many traffic accidents are caused by an insufficient visibility of the vehicles taking part in the traffic also in daylight. To avoid accidents, motor vehicles may accordingly be provided with so-called daytime running lights (DRL). The daytime running light must be designed such that the vehicle can be better observed by others taking part in the traffic without causing any serious annoyance (for example by dazzling). The activation of such a daytime running light may preferably be coupled to given ambient parameters such as, for example, the ambient light level and motor running, in which case it will be permanently switched on. The moment the ambient light falls below a certain value, a switch is to be made from the daytime running light to the low beam. Furthermore, the daytime running light is also switched off when the motor is merely stationary, in particular so as to reduce the power consumption. The requirements for a daytime running light are similar to those for the main beam of a motor vehicle headlight as regards the symmetrical alignment to the horizon. However, the requirements for the light distribution and intensity are strongly different. The intensity is substantially lower and horizontally more widely distributed. In contrast to a comparatively sharp focusing on the horizon (the so-called HV point on the reference axis), the daytime running light has to be wider and flatter. The requirements imposed on the daytime running light (DRL) are laid down in law in a similar manner as for the low beam and the high beam. In addition, a daytime running light must have a long life and a low power consumption.

Known solutions for the realization of a daytime running light function are based on a reduction of the voltage for headlights already present (dimming). Dimming of the existing incandescent lamps leads to a substantial loss in luminous efficacy because the proportion of visible light generated in relation to the total power consumption of the incandescent lamp drops sharply. This causes a strongly increased power consumption which leads also to an undesirable increase in fuel consumption of the motor vehicle. Another aspect of the realization through dimming of the light is that the light distribution thereof is mainly directed at the street because of legal requirements, so as not to dazzle oncoming drivers in darkness. This distribution remains intact also in the dimmed state, so that only a small portion of the light contributes to the improvement of visibility for other persons taking part in traffic. A daytime running light realized in this manner accordingly has a low efficacy and is not suitable as an energy-saving daytime running light (DRL). The use of a dimmed high beam as a daytime running light also has the disadvantage of a light distribution of the high beam which is unsuitable for the function of a daytime running light. Since the high beam is too sharply focused, the distribution of the luminous intensity of a high beam does not comply with the legal requirements for a daytime running beam. In addition, the high beam, if it is to comply with the requirements as regards the maximum luminous intensity of the daytime running light, would have to be dimmed to such an extent that the halogen cycle in the bulb of the incandescent lamp can no longer be maintained. This leads to blackening of the bulb inside and a shortening of lamp life.

The patent document U.S. Pat. No. 5,614,788 discloses an automated daytime running light system which reacts to ambient conditions. The automated daytime running light system for motor vehicles with front lights comprises a circuit for controlling the daytime running light which supplies the incandescent coil for the main beam with a reduced voltage whenever the ignition of the motor vehicle is switched on and the starter is switched off in daylight. Such a daytime running light system realized by means of a high beam has the known disadvantages.

The German patent document laid open to public inspection DE 195 10 542 furthermore, discloses a headlight circuit which is capable of carrying out a switch-over between a normal headlight, a low-beam headlight, and a daytime running light (DRL) by means of a multiple control circuit without a substantial change in the wiring in a cable harness. In spite of a possible simplification in the wiring in the cable harness upon the switch-over of the headlight, the daytime running light created through dimming has the known disadvantages.

SUMMARY OF THE INVENTION

It is accordingly an object of the invention to provide an incandescent lamp which renders possible an improved realization of a daytime running light function in a motor vehicle headlight.

This object is achieved in that the incandescent lamp comprises at least a first incandescent coil for generating a high beam in a motor vehicle headlight and at least a second incandescent coil for generating a daytime running light in a motor vehicle headlight.

The combination of the second incandescent coil with the incandescent coil for the high beam leads to a lamp which offers the functions of a high beam and of the daytime running light in a surprisingly simple manner. The integration into one incandescent lamp according to the invention provides the possibility of use in various motor vehicle headlights without detracting from any existing functions. The motor vehicle headlight need not be newly designed for this, but it can continue to be used with an adapted reflector.

In an advantageous further embodiment of the incandescent lamp according to the invention, an incandescent coil with a power of at most 30 W is provided for forming the second incandescent coil. The daytime running light can be optimized through a suitable choice of the diameter, length, material, and other parameters for the second incandescent coil which generates the daytime running light. In particular, the incandescent coil will be so designed that a maximum luminous efficacy (quantity of light generated per unit power lm/W) of the lamp is achieved at a power of approximately 20 W (maximum 30 W). A value of approximately 20 W is regarded as favorable for a daytime running light in view of the requirements (in particular legal requirements). For comparison, the first incandescent coil usually has a power of 65 W for generating the high beam.

In a preferred embodiment of the invention, the second incandescent coil is arranged so as to lie on the axis of the first incandescent coil. The second incandescent coil may be arranged behind or in front of the first incandescent coil, as viewed from a cap of the incandescent lamp. The arrangement of the two incandescent coils on one common optical axis offers good possibilities for realizing a reflector in which the incandescent lamp can be accommodated and which generates a suitable high beam as well as a daytime running beam in a headlight unit. Alternative arrangements of the two incandescent coils in a bulb of the incandescent lamp are indeed possible within the scope of the invention, if the requirements of a given application make a different arrangement seem more favorable (for example, parallel next to one another, or at right angles to one another). These requirements may be, for example, legal requirements imposed on the headlight into which the incandescent lamp is to be incorporated or on the incandescent lamp itself. Particular requirements may also arise on the basis of the manufacturing process.

In an embodiment of the invention, a first electrical current lead is provided to a first connection of the first incandescent coil, a second electrical current lead is provided to a first connection of the second incandescent coil, and a third electrical current lead is provided to a second connection of the first and of the second incandescent coil, the leads passing through the lamp cap.

Further advantageous embodiments of the invention are defined in the further dependent claims.

BRIEF DESCRIPTION OF THE DRAWING

An embodiment of the invention will be explained in more detail below with reference to drawings, in which FIG. 1 diagrammatically shows an incandescent lamp according to the invention, and FIG. 2 diagrammatically shows the incandescent lamp according to the invention in a reflector.

DETAILED DESCRIPTION OF THE INVENTION

Figure 1:
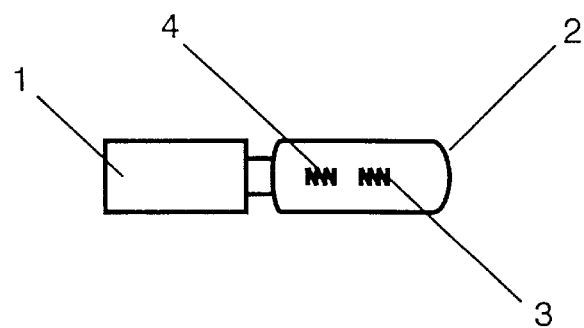

FIG. 1 shows the construction principle of an incandescent lamp according to the invention. A lamp cap 1 is connected to a bulb 2 in a gastight manner. The transparent glass bulb 2 is sealed in a known, vacuumtight manner and contains a halogen. A first incandescent coil 3 and a second incandescent coil 4 are arranged in the bulb 2, generating a high beam and a daytime running beam, respectively, when the incandescent lamp is incorporated in a motor vehicle headlight. The motor vehicle headlight (not shown) comprises a reflector with a suitable holder for the lamp cap 1, so that the incandescent lamp can be fitted and fixed therein.

Figure 2:
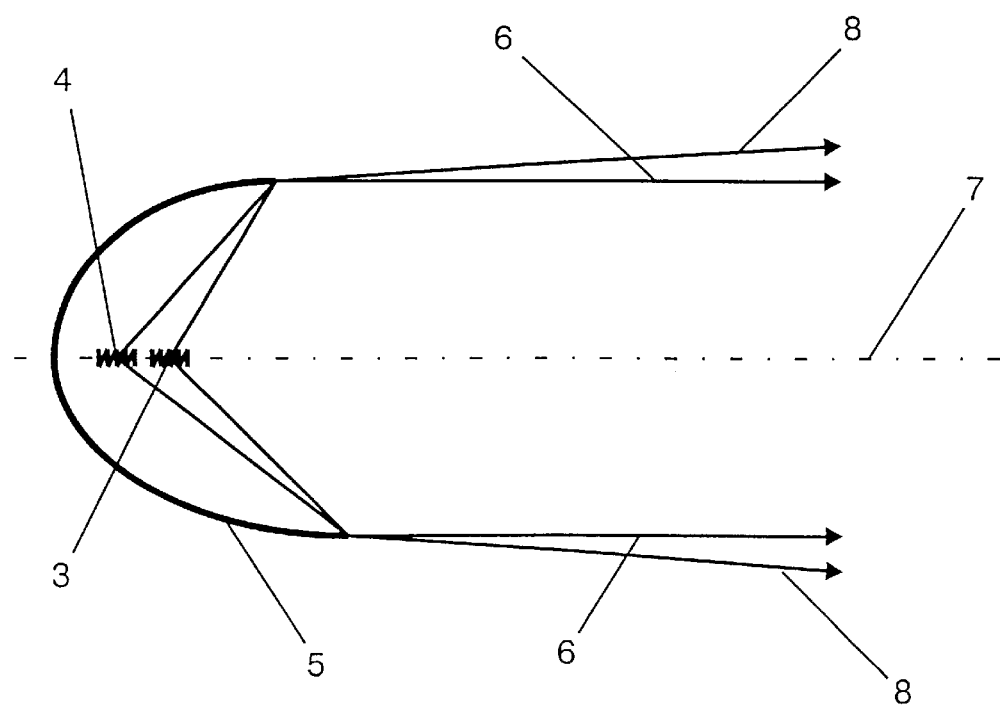

FIG. 2 diagrammatically shows the arrangement of the two incandescent coils 3 and 4 of the incandescent lamp according to the invention in a reflector 5 which forms part of a headlight which is not shown. The incandescent coil 3 for the high beam together with the reflector 5 generates a beam 6 which issues in a parallel shape. The incandescent coil 4 for the daytime running light lies, as does the incandescent coil 3, with its coil axis on an optical axis 7 of the headlight and is arranged behind the incandescent coil 3 as seen from the opening of the reflector 5. The incandescent coil 4 together with the reflector 5 generates a wider beam 8 corresponding to the daytime running light, which is less sharply focused when issuing from the reflector 5. The bulb 2 and the lamp cap I of the incandescent lamp are not shown in this functional representation for greater clarity. The incandescent lamp is fastened in a known manner in the reflector 5 by means of a suitable holder for the lamp cap 1. A good alignment and subsequent fixation of the incandescent lamp in the desired position in the reflector 5 is to be achieved thereby. The reflector 5 is shaped such that the two beams 6 and 8 can be generated in that case.

What is claimed is:

1. A motor vehicle headlight comprising a first incandescent coil for generating a high beam, a second incandescent coil for generating a daytime running beam, the first and second incandescent coils being partially enclosed by a reflector, the reflector having an optical axis, the first incandescent coil being located on the optical axis, the second incandescent coil operating at a substantially constant voltage, emitting light with a substantially lower intensity than the first incandescent coil and being positioned in the reflector to produce a light beam which is evenly distributed between a portion of the light beam which is directed to street level and one of more portions of the light beam that are directed to other directions, the light beam being more widely distributed horizontally and in a plane parallel to a front surface of a vehicle in which the headlight is mounted, than a light beam from the first incandescent coil.

2. A motor vehicle headlight as claimed in claim 1, wherein power consumption of the second incandescent coil does not exceed 30 W.

3. A motor vehicle headlight as claimed in claim 2, wherein the second incandescent coil has a maximum luminous efficiency at a power substantially equal to 20 W.

4. A motor vehicle headlight as claimed in claim 1, wherein the second incandescent coil is arranged so as to lie on the optical axis.

5. A motor vehicle headlight as claimed in claim 4, wherein the second incandescent coil lies in front of the first incandescent coil, as viewed from a lamp cap of the incandescent lamp.

6. A motor vehicle headlight as claimed in claim 4, wherein the second incandescent coil lies behind the first incandescent coil, as viewed from a lamp cap of the incandescent lamp.

7. A motor vehicle headlight as claimed in claim 1, wherein the first incandescent coil and the second incandescent coil are accommodated in a gastight transparent vessel, the gastight transparent vessel being connected to a lamp cap in a gastight manner.

8. A motor vehicle headlight as claimed in claim 7, wherein the reflector is adapted to allow the motor vehicle headlight to be installed in a fitting originally designed for a type of motor vehicle headlight without a daytime running beam.

* * * * *